Jan. 22, 1963  R. D. BEALE ETAL  3,074,432
VALVE FOR GAS TURBINE ENGINES
Filed April 24, 1959  2 Sheets-Sheet 2
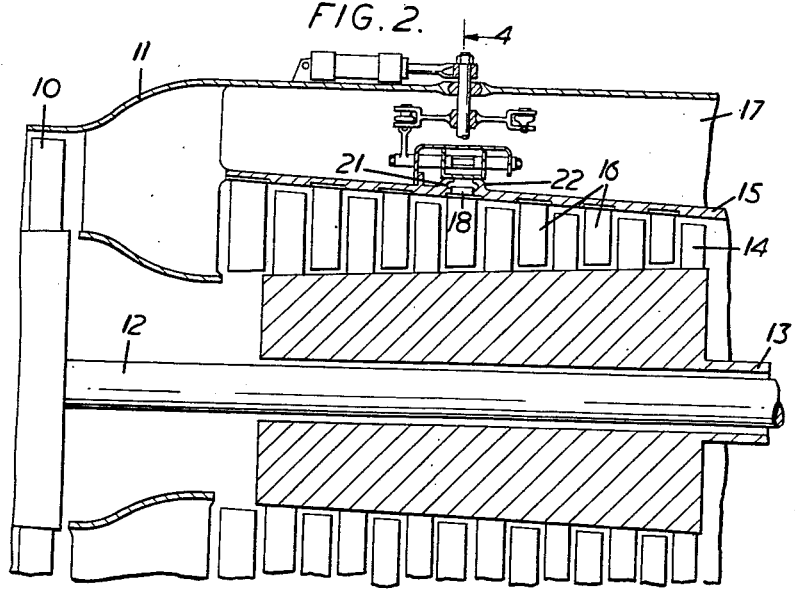
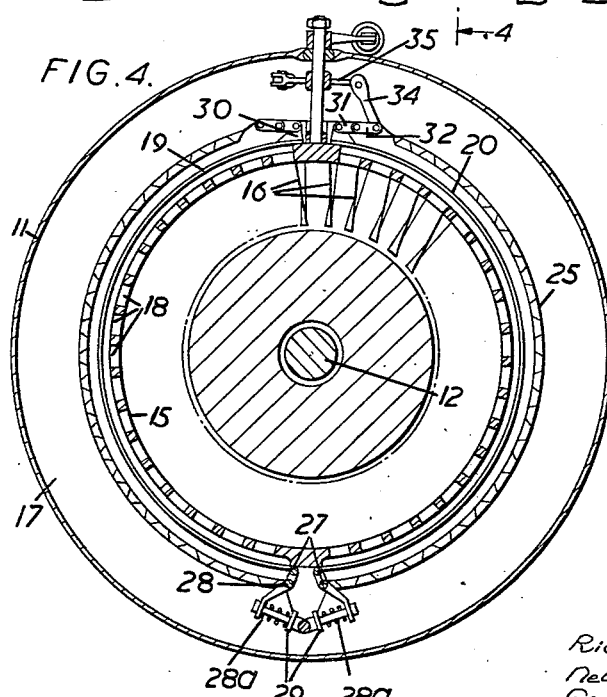
Richard Derby Beale,
Nelson Hector Kent,
Geoffrey Light Wilde
Inventors
By Leech & Radue
Attorneys United States Patent Office 3,074,432
Patented Jan. 22, 1963

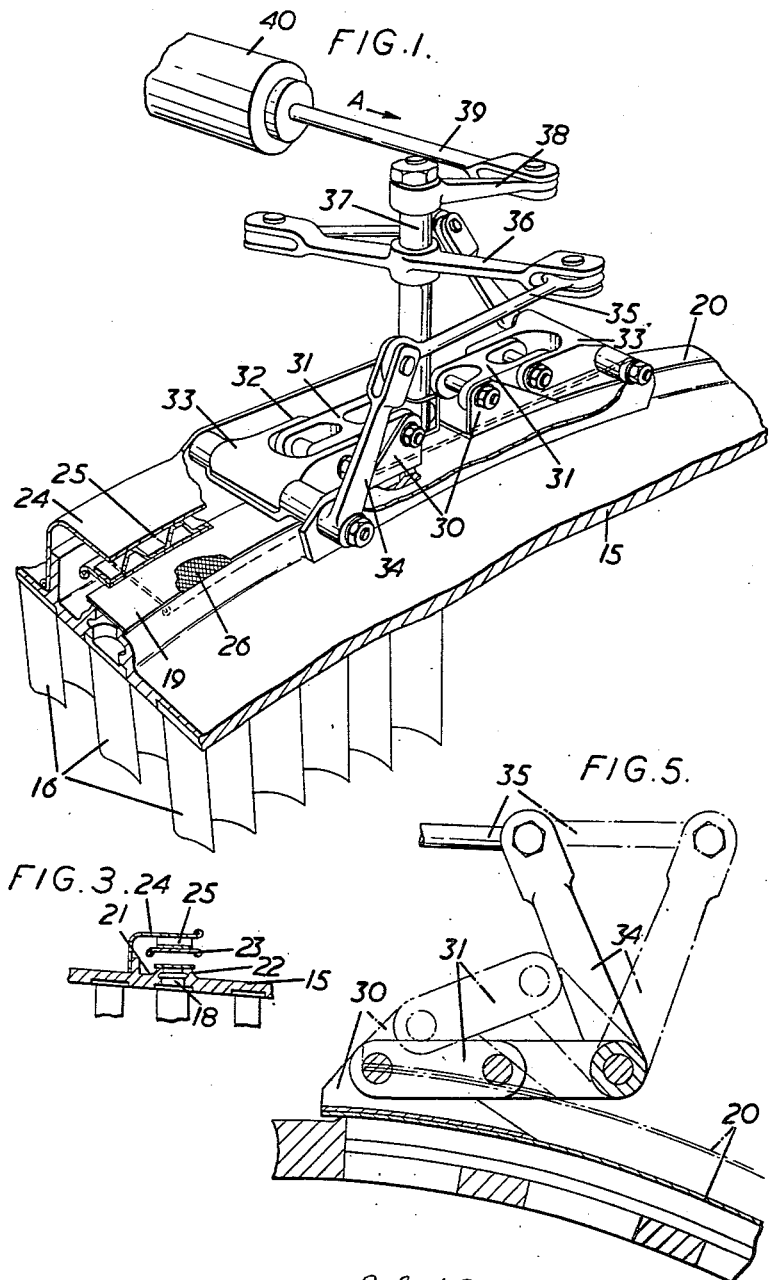

3,074,432
VALVE FOR GAS TURBINE ENGINES
Richard Derby Beale, Quarndon, Nelson Hector Kent, Derby, and Geoffrey Light Wilde, Shottlegate, England, assignors to Rolls-Royce Limited, Derby, England, a company of Great Britain
Filed Apr. 24, 1959, Ser. No. 808,656
Claims priority, application Great Britain May 15, 1958
8 Claims. (Cl. 137—625.28)

This invention relates to the compressors of gas turbine engines.

According to the present invention there is provided a compressor adapted to form part of a gas turbine engine comprising an apertured casing and a bleed valve which controls the bleeding of air through the apertures in said casing, the bleed valve comprising a band encircling the compressor casing and means for moving said band between, and for retaining it in, a closed position in which the band covers and seals said apertures and an open position in which it uncovers the apertures so as to allow a bleed of air out of the compressor.

Preferably the band is discontinuous, the means for changing the position of the band being disposed adjacent the ends of the band.

Preferably an abutment is provided, which may be in the form of a flange supported from the compressor casing and encircling the band, to limit the movement of the band away from the closed position.

The means for changing the position of the band can be, for example, a quick acting toggle mechanism.

If desired, the band can be of steel and can be provided with a liner of a sealing material which incorporates a lubricant to allow a degree of circumferential slippage of the band relatively to the compressor casing. The band can be of a sealing material known as, and sold under the registered trademark "Twilstele." "Twilstele" is a woven material formed of long fibre asbestos yarn with high grade steel running through the centre of each strand and with a reinforcement of steel wire closely interwoven in the asbestos yarn weave. The fabric so produced is impregnated with an oil resisting compound and has a graphite coating applied to it. The material has great tensile strength and heat resistance, a degree of compressibility, and provides a perfect seal. It has the additional advantage that it will accommodate circumferential slipping of the brake band valve.

If desired, means can be incorporated in the band for allowing controlled thermal expansion and contraction of the band whilst maintaining the seal with the compressor casing, when the band is in the closed position. For example, the band can be split and the adjacent ends of the bands where it is split can be joined by resilient means such as a coil spring.

The bleed valve, according to this invention, has a particular application to a by-pass engine in which the band can be incorporated in the casing of the high pressure compressor so as to bleed compressed air into the by-pass duct.

Alternatively in the case of a high-pressure-ratio simple gas turbine engine, the band could be on the outside of the compressor casing and could spill air overboard rather than into a by-pass or nacelle.

The invention is illustrated, merely by way of example, in the accompanying drawings in which:

FIGURE 1 shows a broken perspective view of a bleed valve and operating mechanism forming part of a compressor according to the invention;

FIGURE 2 is an axial section through the compressor of a by-pass gas turbine engine incorporating the bleed valve shown in FIGURE 1;

FIGURE 3 is a reduced scale longitudinal section through the same bleed valve mechanism;

FIGURE 4 is a full transverse section through the compressor on the line 4—4 of FIGURE 2, parts not material to the invention being shown symbolically; and FIGURE 5 is a diagram to illustrate the operation of the bleed valve mechanism.

In FIGURES 2 and 4 is shown the low pressure compressor 10 of a by-pass gas turbine engine, the engine having an outer casing 11.

The low pressure compressor 10 is mounted on a shaft 12 which runs concentrically through a shaft 13 carrying a high pressure compressor 14. The high pressure compressor 14 has an outer casing 15 which carries stator blades 16.

The by-pass passage 17 is formed between the outer casing 11 of the engine and the outer casing 15 of the high pressure compressor.

In the outer casing 15 of the compressor is formed a circumferential row of holes 18 which are spaced intermediate the stator blades 16.

This row of holes in the casing allows a bleed of air from the compressor into the by-pass passage 17. The bleed of air is controlled by a valve in the form of a two-part band 19 and 20 (FIGURE 4) hereinafter referred to as a band valve.

In its closed position the two-part band valve 19, 20 is in sealing engagement with the flanges 21, 22 formed on the outer periphery of the high pressure compressor casing 15 (FIGURE 2 and FIGURE 3) on either side of the row of holes 18.

The opening of the band valve which takes place with a radial and circumferential movement of the bands is limited by a circumferential stop member 23 (FIG. 3) which is spaced radially from the flanges 21, 22, the stop member being supported from a bracket 24 by a corrugated web 25.

The band valve is made of steel with an inner lining 26 (FIGURE 1) of the material sold under the registered trademark "Twilstele."

The lower end of each part of the band 19, 20 is pivoted to an arm 27. Each arm is pivoted about a point 28 to a fixed structure for example the compressor casing (FIGURE 4). Movement of each of the arms 27 resulting from thermal expansion is controlled by a spring 28a bearing against a pivoted abutment 29. The spring is so arranged that it tends to tighten the valve bands 19 and 20 on to the flanges 21 and 22. The springs 28a are included to accommodate expansion of the casing 15. This expansion will cause relative movement between the band and the casing but the band will be maintained in contact with the flanges by the springs 28a during thermal expansion.

The upper ends of each of the bands 19 and 20 is attached to a trunnion plate 30. Each trunnion plate 30 has pivoted to it a link 31. The other end of each link 31 is pivoted to one arm 32 of a bell crank lever 33. The other arm 34 of the bell crank lever 33 is pivoted to a link 35 in turn pivoted to a cross arm 36 attached to a shaft 37. The shaft 37 is attached to an additional arm 38 which is pivoted to the piston rod 39 of a hydraulic cylinder 40.

Each link 31 and the bell crank lever arm 32 pivoted to it constitutes a toggle which, due to the resilience of the band, assumes an open position as shown in dotted lines in FIGURE 5.

In use, when the hydraulic cylinder is operated to open the holes 18, the piston rod 39 moves in the direction of arrow A in FIGURE 1, and moves the arm 38 and cross arm 36 thus moving links 35 and arms 34 of bell crank levers 33. The consequent movement of bell crank levers 33 moves the links 31 from the position shown in firm line in FIGURE 5 to the position shown in dotted lines. As a result the trunnion plate 30 moves outwardly away from the compressor casing and also moves circumferentially around the casing thus moving its associated band portion 19 and 21 clear of the casing.

The condition of the links shown in solid lines in FIGURE 5 may be called a "dead-center" condition and the links may move inwardly from it a slight amount, in the customary manner for a toggle, to automatically lock the bands in a position closing the openings 18.

It will be appreciated that the mechanism operated by the cylinder 40 and piston rod 39 moves the two parts 19 and 20 of the band simultaneously so that the whole of the circumferential row of holes 18 is opened or closed simultaneously.

The mechanism also ensures that the holes are opened or closed quickly thus avoiding the setting up of large pressure differences around the compressor casing.

When the band portions 19 and 20 are opened, air is allowed to escape from the compressor through the holes 18 and can flow round the band and through the apertures between the corrugated web 25 into the by-pass passage.

Although the band bleed valve has been shown applied to a combined by-pass engine it is equally applicable to a simple gas turbine engine in which case it would be mounted on the outside of the single compressor casing.

We claim:

1. A valve assembly comprising a cylindrical casing having a ring of apertures therein, a resilient band encircling said casing at and adjacent the apertured ring, said band comprising two imperforate portions, means connecting one end of each portion to said casing and including spring means to compensate for thermal expansion and contraction of the band portions and the casing, a two-position toggle mechanism connected to the opposite end of each said portion and to said casing for swiftly moving the band portions through a dead center condition to a position which tightens them into sealing engagement with the casing and closes the apertures, or to an open position in which they uncover the apertures under the resilient action of the band portions, said spring means insuring band contact and seal with the casing when in closed position, and means to actuate said toggle mechanism.

2. A valve assembly comprising a casing having a circumferential row of apertures therein, resilient imperforate band means disposed about said casing for sealing and unsealing said apertures, said band means terminating in two adjacent ends, a toggle mechanism interconnecting said ends for contracting and expanding said band means, said toggle mechanism having a first limiting setting in which said ends are relatively widely spaced and the band means is radially spaced outwardly of said casing and unseals said apertures, an intermediate dead-center condition, and a second limiting setting in which said ends are relatively closed spaced and the band means engages said casing and seals said apertures, and adjusting means for moving said toggle mechanism between said limiting settings via said dead-center condition, the resilience of the band means tending to cause the band means to expand said ends when the toggle mechanism is in its second setting, so that when the adjusting means moves the toggle mechanism from its second setting, via the dead-center condition towards the first setting, said ends separate rapidly so that the band means moves radially outwardly of the casing and quickly unseals said apertures.

3. A valve assembly as claimed in claim 2 including an abutment disposed about said casing and said band means and spaced radially outwardly of said casing, said abutment limiting radially outward movement of the band means when the toggle mechanism is in its first setting.

4. A valve assembly as claimed in claim 2 in which said band means carries a liner which faces towards said casing and which incorporates a lubricant allowing a degree of circumferential slippage of the band means relatively to the casing.

5. A valve assembly comprising a fixed structure incorporating a casing, said casing having a circumferentially extending row of apertures therein, resilient imperforate band means disposed about said casing for sealing and unsealing said apertures, said band means having two ends, one of said two ends of the band means being connected to said fixed structure, a toggle mechanism interconnecting the other of said two ends of the band means to said fixed structure for contracting and expanding said band means, said toggle mechanism having a first limiting setting in which said band means is radially spaced outwardly of said casing and unseals said apertures, an intermediate dead-center condition, and a second limiting setting in which said band means engages said casing and seals said apertures, and adjusting means for moving said toggle mechanism between said limiting settings via said dead-center condition, the resilience of the band means tending to cause the band means to expand when the toggle mechanism is in its second setting, so that when the adjusting means moves the toggle mechanism from its second setting via the second dead-center condition towards the first setting, the band means moves rapidly radially outwardly of the casing and quickly unseals said apertures.

6. A valve assembly as claimed in claim 5 including an abutment disposed about said casing and said band means and spaced radially outwardly of said casing, said abutment limiting radially outward movement of the band means when the toggle mechanism is in its first setting.

7. A valve assembly as claimed in claim 5 in which said band means carries a liner which faces towards said casing and which incorporates a lubricant allowing a degree of circumferential slippage of the band means relatively to the casing.

8. A valve assembly as claimed in claim 5 including resilient tensioning means by which said one of the two ends of the band means is connected to said fixed structure.

References Cited in the file of this patent

UNITED STATES PATENTS

| 1,601,737 | Johnson | Oct. 5, 1926 |
| 1,797,027 | Smith | Mar. 17, 1931 |
| 2,780,320 | Walter | Feb. 5, 1957 |
| 2,850,227 | Wheatley | Sept. 2, 1958 |
| 2,874,926 | Gaubatz | Feb. 24, 1959 |

FOREIGN PATENTS

| 399,092 | France | Apr. 9, 1909 |
| 524,162 | Belgium | Nov. 30, 1953 |
| 586,710 | Great Britain | Mar. 28, 1947 |
| 595,351 | Great Britain | Dec. 3, 1947 |
| 672,193 | Great Britain | May 14, 1952 |
| 879,280 | Germany | June 11, 1953 |
| 1,012,339 | France | Apr. 16, 1952 |